June 8, 1926.  1,587,532

W. L. LINDGREN

AUTOMATIC CLUTCH

Filed May 17, 1924

Inventor:
Waldemar L. Lindgren
By John Howard McElroy
his atty.

Patented June 8, 1926.

1,587,532

UNITED STATES PATENT OFFICE.

WALDEMAR L. LINDGREN, OF CHICAGO, ILLINOIS, ASSIGNOR, BY DIRECT AND MESNE ASSIGNMENTS, TO ALFRED A. NORTON, TRUSTEE, OF CHICAGO, ILLINOIS.

AUTOMATIC CLUTCH.

Application filed May 17, 1924. Serial No. 713,920.

My invention is concerned with automatic clutches to connect rotating members, and it is designed to produce a device of the class described that shall be simple in its construction yet effective in its operation, and which shall not require extreme accuracy in its construction.

This invention is intended primarily as an improvement on the clutch shown in my Patent No. 1,472,480, granted October 30, 1923, although in some of its features it is capable of a more general application.

To illustrate my invention, I annex hereto a sheet of drawings, in which the same characters are used to designate identical parts in all the figures, of which:—

Figure 1:
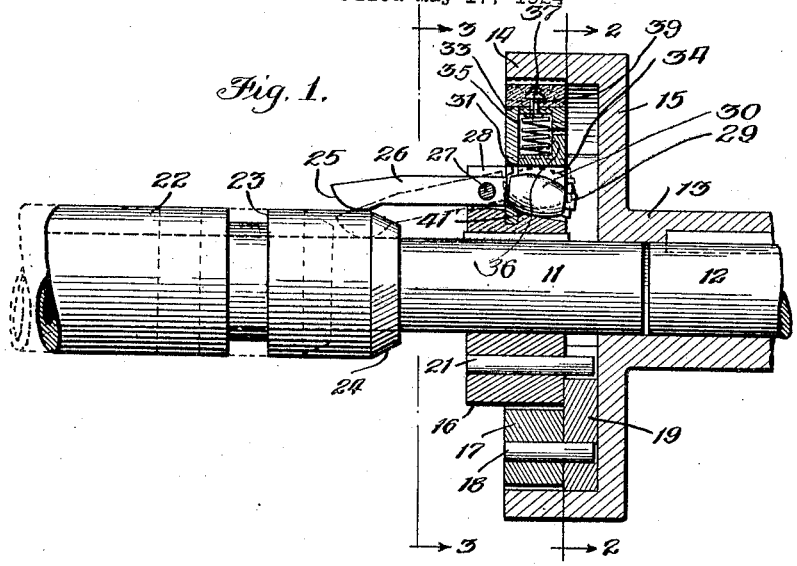
Figure 2:
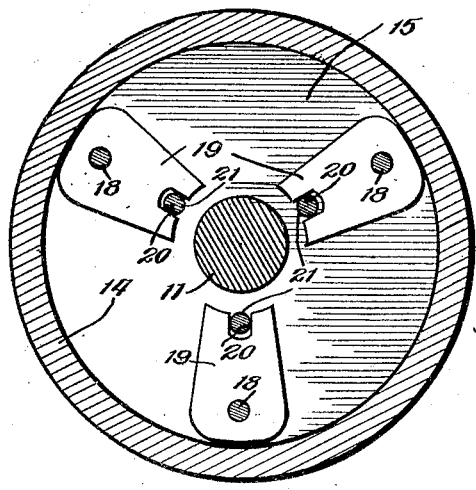
Figure 3:
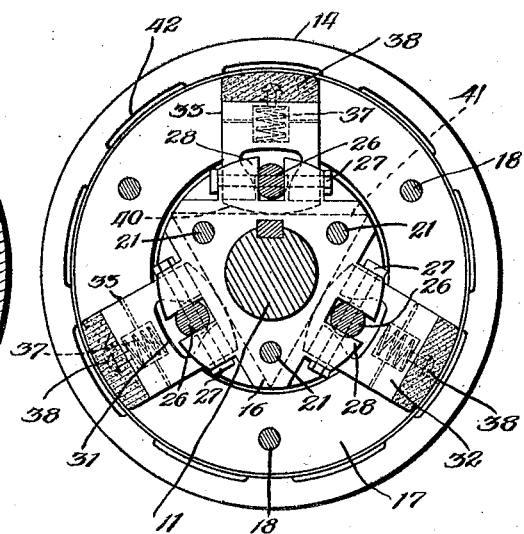

Fig. 1 is a central vertical section through a clutch embodying my invention; and Figs. 2 and 3 are views in section on the lines 2—2 and 3—3 respectively, of Fig. 1.

In the specific application of my invention illustrated, 11 is the driving shaft journaled in suitable bearings, and which is shown as substantially abutting the driven shaft 12, which has the driven member 13 fixed thereon, the body of said driven member consisting of an annular portion 14, which might be used as a belt pulley and which is connected to the hub 13 by the disk portion 15. Rigidly secured on the driving shaft 11, which may conveniently have a bearing in the hub 13 of the driven member, is the collar 16, of a construction to be hereinafter more fully described. Surrounding the inner end of the collar and within the cup 14 is a ring 17 held in place by means to be subsequently described. This ring 17 has secured therein and extending inwardly therefrom the three pins 18, which serve as fulcrums for the three short clutch levers or dogs 19, which have their inner ends slotted, as seen at 20, to receive the three pins 21 secured in the collar 16 and extending inwardly into the slots 20. The outer ends of the dogs 19 are eccentric to their fulcrum pins 18, although concentric to the driving shaft 11, so that when said dogs are swung in either direction from the neutral position shown in Fig. 2, they will clutch the inner surface of the annulus or cup 14, and it will be obvious that by the means of the mechanism thus far described, when the shaft 11 is started to rotate in either direction the pins 21 will swing the dogs 19 so as to clutch the cup 14 to the collar 16, thus insuring the shaft 12 rotating with the shaft 11.

Some means must be provided for unclutching the dogs 19 whenever it may be desired, and for this purpose I provide the shifting sleeve 22 mounted to slide longitudinally on the shaft 11, and having the annular channel 23 which is intended to receive the fork, not shown, of the customary shipper lever. The end of the sleeve 22 is bevelled, as shown, at 24, and is adapted when thrust in as shown in Fig. 1, to engage the rounded ends 25 of the three clutch levers 26 which are fulcrumed on the pins or bolts 27, passed through the pairs of ears 28, formed by cutting away portions of the periphery of the outer part of the collar 16, as will be readily apparent from a consideration of Fig. 3. I preferably mount on the reduced inner ends 29 of the levers 26 the anti-friction rollers 30 which are of the proper size to fit closely in the reduced inner ends of the generally triangular recesses 31 formed in the front faces of the friction shoes or blocks 32, mounted to slide radially in the correspondingly shaped recesses 33 formed in the front portion of the ring 17. Recesses 34 of the proper size to receive the rollers 30 are also formed in the outer portion of the collar 16. The recesses 33 in the ring 17 in the inner portion of said ring are only deep enough to accommodate the thin front portion of the blocks 32, while at its outer portion they are deep enough to accommodate the thickened outer portion of the shoes 32, said thickened outer portions having the radial recesses 35 therein in register with corresponding recesses 36 formed in the remaining portion of the ring 17. A helically coiled expanding spring 37 is placed with its ends in the bottom of each of these recesses 35 and 36 so as to tend to thrust the brake shoes 32 upward so that the leather shoe portions 38 secured to the bodies by the rivets 39 will tend to engage the inner periphery of the annulus or cup 14.

The operation of the apparatus as thus far described will be readily understood. Assuming that the sleeve 22 is in the position shown in dotted lines in Fig. 1, the levers 26 are then free to be pulled into their dotted line position by the action of the springs 37 acting through the bottoms of the recesses 31 on the rollers 30. With the parts in this position, as soon as the shaft 11 begins to rotate, the pins 21 tilt the dogs 19 in whichever direction they are rotated, thus clutching them to the adjacent inner periphery of the cup 14, causing the shaft 12 to rotate in unison with the shaft 11. The shoes 38 are in this position in engagement with the adjacent inner periphery of the cup 14. When it is desired to unclutch the shaft 12 from the shaft 11, the sleeve 22 is shifted to the full line position of Fig. 1, in which the anti-friction rollers 30 acting on the inclined sides of the recesses 31 bring the ring 17 into its unclutching relation to the collar 16 so that the dogs 19 are brought into the true radial relation shown in full lines in Fig. 2, where they are unclutched from the cup 14, which is now free to come to rest. The rollers 30 at the same time engaging the bottoms of the recesses 31 draw the shoes 32 radially inward so that the leather surfaces 38 are disengaged from the inner periphery of the cup 14. It may be here noted that to accommodate the rounded inner ends 40, as seen in dotted lines in Fig. 3, of the shoes 32, the collar 16 has cut therein the three narrow recesses 41 which have the general shape of secants of circles. While the inner periphery of the cup 14 might be a true circle throughout, as it is in the inner portion thereof with which the ends of the clutch dogs 19 co-operate, I preferably form on the outer portion thereof the shallow elongated recesses 42, preferably three times as many in number as the brake shoes 32 and shaped so that the outer leather ends 38 thereof are adapted to fit therein, and thus secure a more efficient frictional engagement between said shoes and the cup than would otherwise exist.

The object of employing the brake shoes 32 with their leather ends 38 is to slow up the ring 17 in its movement relative to the collar 16 when the sleeve 22 is pulled away from the clutch to bring it into action again. While the clutch works all right without such means, I have found that there is sometimes a little delay in the clutch taking hold, because until the ring 17 lags relative to the collar 16, the swinging of the dogs 19 cannot take place, and as this occasional delay is sometimes objectionable to some users, I preferably add the brake shoes 32 to engage the inner periphery of the annulus 14 and immediately slow up the ring 17 relative to the collar 16, thereby producing an immediate clutching action.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:—

1. In a clutch, the combination with a rotating driving member, of a driven member concentric therewith and including a cup, a ring mounted to rotate with the driving member but capable of slight angular displacement relative thereto, a plurality of clutch dogs pivoted on the ring and having their outer ends adjacent the inner periphery of the cup, connections between the dogs and the driving member to swing them to clutching position by relative movement of the driving member and the ring, and a spring pressed brake member carried by the ring and adapted to engage the adjacent inner periphery of the cup when free to do so, said inner periphery being provided with elongated shallow recesses at intervals of a length adapted to co-operate with the ends of the brake, substantially as and for the purpose described.

2. In a clutch, the combination with a rotating driving member, of a driven member concentric therewith and including a cup, a ring mounted to rotate with the driving member but capable of slight angular displacement relative thereto, a plurality of clutch dogs pivoted on the ring and having their outer ends adjacent the inner periphery of the cup, connections between the dogs and the driving member to swing them to clutching position by relative movement of the driving member and the ring, and a plurality of spring pressed brake members carried by the ring and adapted to engage the adjacent inner periphery of the cup when free to do so, said inner periphery being provided with elongated shallow recesses at intervals of a length into which the ends of the brake members are adapted to fit.

3. In a clutch, the combination with a rotating driving member, of a driven member concentric therewith and including a cup, a ring mounted to rotate with the driving member but capable of slight angular displacement relative thereto, a plurality of clutch dogs pivoted on the ring and having their outer ends adjacent the inner periphery of the cup, connections between the dogs and the driving member to swing them to clutching position by relative movement of the driving member and the ring, a spring pressed brake member carried by the ring and adapted to engage the inner periphery of the cup when free to do so, a lever fulcrumed on the driving member and co-operating with the brake member to retract the same, and a cam sleeve sliding on the driving member and engaging the end of the lever, for the purpose described.

4. In a clutch, the combination with a rotating driving member, of a driven member concentric therewith and including a cup, a ring mounted to rotate with the driving member but capable of slight angular displacement relative thereto, a plurality of clutch dogs pivoted on the ring and having their outer ends adjacent the inner periphery of the cup, connections between the dogs and the driving member to swing them to clutching position by relative movement of the driving member and the ring, a spring pressed brake member carried by the ring and adapted to engage the inner periphery of the cup when free to do so, a lever fulcrumed on the driving member and passing through an aperture in the brake member so that when it is swung it will retract the brake member against the thrust of its spring and in turn will be swung back by the spring acting through the brake member when it is released, and a cam sleeve sliding on the driving member and engaging the end of the lever, for the purpose described.

5. In a clutch, the combination with a rotating driving member, of a driven member concentric therewith and including a cup, a ring mounted to rotate with the driving member but capable of slight angular displacement relative thereto, a plurality of clutch dogs pivoted on the ring and having their outer ends adjacent the inner periphery of the cup, a collar secured on the driving member inside of the ring provided with radial ears and a sector slot at right angles to the ears, pins carried by the collar and co-operating with slots in the dogs to swing them to clutching position by a relative movement of the driving member and the ring, a spring pressed brake member carried by the ring and having its reduced inner end portion extending into the sector slot and provided with a recess in said reduced portion narrow at its inner end and flaring outward, a lever pivoted between the ears on the collar and passing through the recess to retract the brake member, and a cam sleeve sliding on the driving member and engaging the adjacent end of the lever, for the purpose described.

In witness whereof, I have hereunto set my hand this 8th day of May, 1924.

WALDEMAR L. LINDGREN.